United States Patent
Pei et al.

(10) Patent No.: US 11,597,277 B2
(45) Date of Patent: Mar. 7, 2023

(54) VEHICLE ELECTRONIC DEVICE, ELECTRONIC DEVICE, INFORMATION RECEIVING AND SENDING METHODS THEREOF, SERVER AND COMMUNICATION SYSTEM

(71) Applicant: BOE TECHNOLOGY GROUP CO., LTD., Beijing (CN)

(72) Inventors: Hongyan Pei, Beijing (CN); Huawei Yu, Beijing (CN); Wei Deng, Beijing (CN); Shijie Cao, Beijing (CN); Tao Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 327 days.

(21) Appl. No.: 16/758,764

(22) PCT Filed: Mar. 25, 2019

(86) PCT No.: PCT/CN2019/079512
§ 371 (c)(1),
(2) Date: Apr. 23, 2020

(87) PCT Pub. No.: WO2019/184870
PCT Pub. Date: Oct. 3, 2019

(65) Prior Publication Data
US 2020/0254878 A1    Aug. 13, 2020

(30) Foreign Application Priority Data
Mar. 26, 2018 (CN) .......................... 201810253275.4

(51) Int. Cl.
*H04W 4/80* (2018.01)
*B60K 35/00* (2006.01)
(Continued)

(52) U.S. Cl.
CPC ............ *B60K 35/00* (2013.01); *H04L 9/0869* (2013.01); *H04L 9/3228* (2013.01); *H04W 4/40* (2018.02);
(Continued)

(58) Field of Classification Search
CPC ....................................................... H04L 12/28
See application file for complete search history.

(56) References Cited

U.S. PATENT DOCUMENTS

| 9,499,125 | B2 | 11/2016 | Akay et al. |
| 9,852,563 | B2 | 12/2017 | Bergerhoff et al. |
| 2018/0013758 | A1 | 1/2018 | Yu |
| 2020/0254878 | A1 | 8/2020 | Pei et al. |
| 2022/0114245 | A1* | 4/2022 | Krishan ................. G06F 21/32 |

FOREIGN PATENT DOCUMENTS

| CN | 101315731 A | 12/2008 |
| CN | 102184577 A | 9/2011 |

(Continued)

OTHER PUBLICATIONS

CN 106335572, Univ Wuhan, pp. 1-6, Dec. 2016.*
First Chinese Office Action Application No. 201810253275.4; dated Nov. 5, 2019.

*Primary Examiner* — Dang T Ton (57) ABSTRACT

A vehicle electronic device, an electronic device and information receiving and sending methods thereof, a server and a communication system. The vehicle electronic device includes: a first processing component and a first storage component connected with the first processing component. First password information and vehicle information are stored in the first storage component. The first processing component Is configured to generate a second dynamic password according to the first time for receiving a connection request and the first password information and the vehicle information stored in the first storage component (Continued)

when receiving the connection request including a first dynamic password sent by an external electronic device, and to receive information sent by the external electronic device when determining that the second dynamic password is matched with the first dynamic password.

13 Claims, 7 Drawing Sheets

(51) Int. Cl.
    *H04W 4/40* (2018.01)
    *H04L 9/08* (2006.01)
    *H04L 9/32* (2006.01)
(52) U.S. Cl.
    CPC ......... *H04W 4/80* (2018.02); *B60K 2370/164* (2019.05); *B60K 2370/5911* (2019.05); *H04L 2209/80* (2013.01); *H04L 2209/84* (2013.01)

(56) References Cited

FOREIGN PATENT DOCUMENTS

| | | |
|---|---|---|
| CN | 105196971 A | 12/2015 |
| CN | 205281599 U | 6/2016 |
| CN | 105791388 A | 7/2016 |
| CN | 105916143 A | 8/2016 |
| CN | 105916742 A | 8/2016 |
| CN | 106228651 A | 12/2016 |
| CN | 106335572 A | 1/2017 |
| CN | 106553617 A | 4/2017 |
| CN | 106627484 A | 5/2017 |
| CN | 106780859 A | 5/2017 |
| CN | 107074174 A | 8/2017 |
| CN | 107154115 A | 9/2017 |
| CN | 107221086 A | 9/2017 |
| CN | 107294926 A | 10/2017 |
| CN | 108471415 A | 8/2018 |
| JP | 2009069928 A | 4/2009 |
| WO | 2017090951 A1 | 6/2017 |

* cited by examiner

VEHICLE ELECTRONIC DEVICE, ELECTRONIC DEVICE, INFORMATION RECEIVING AND SENDING METHODS THEREOF, SERVER AND COMMUNICATION SYSTEM

CROSS-REFERENCE TO RELATED APPLICATION

This application claims priority to Chinese Patent Application No. 201810253275A, entitled "Vehicle Electronic Device, Electronic Device and Information Receiving and Sending Method" and filed with CNIPA on Mar. 26, 2018, the disclosure of which is hereby incorporated by reference in its entirety.

TECHNICAL FIELD

Embodiments of the present disclosure relate to a vehicle electronic device, an electronic device, information receiving and sending methods thereof, a server, and a communication system.

BACKGROUND

In modern life, driving is becoming more and more popular, and various types of vehicle electronic devices applied in motor vehicles increasingly show a high-end and intelligent trend.

At present, when a vehicle is parked illegally, a traffic police usually manually attach a paper traffic ticket on a vehicle shell. When handling annual check and/or insurance affairs, the vehicle needs to be driven to an appointed vehicle management administration to manually attach paper annual check and/or insurance bar codes. The driver needs to pay parking fees manually with a car park manager after parking in the car park, causing the problems of low interaction efficiency and complex and time-consuming process when the vehicle interacts with an external device.

SUMMARY

Embodiments of the present disclosure provide a vehicle electronic device, an electronic device and information receiving and sending methods thereof, a server, and a communication system.

At least one embodiment of the present disclosure provides a vehicle electronic device, comprising, a first processing component and a first storage component connected with the first processing component. First password information and vehicle information are stored in the first storage component. The first processing component is configured to generate a second dynamic password through a preset rule according to a first time for receiving a connection request, and the first password information and the vehicle information stored in the first storage component, when receiving the connection request including a first dynamic password sent by an external electronic device, and to receive information sent by the external electronic device when determining that the second dynamic password is matched with the first dynamic password. The first dynamic password is a dynamic password generated by a server through the preset rule, according to the vehicle information sent by the electronic device, a second time for receiving the vehicle information, and first password corresponding information stored in the server; and sent to the electronic device; the first password corresponding information is matched with the first password information; and a difference between the first time and the second time is less than or equal to a preset duration.

For example, the first processing component is also configured to send the information to the electronic device carried by a vehicle owner when receiving the connection request sent by the electronic device carried by the vehicle owner.

For example, the first password information includes a first random number seed and a first static password; and the first password corresponding information includes a first corresponding random number seed and a first corresponding static password.

For example, the vehicle electronic device further comprises a display screen and a Bluetooth component connected with the first processing component. The display screen is configured to display at least one of annual check and insurance information of a vehicle; and the first processing component is communicated with the external electronic device through the Bluetooth component.

For example, the display screen is an electronic ink display screen.

At least one embodiment of the present disclosure also provides an electronic device communicated with the vehicle electronic device. The electronic device comprises: a second processing component configured to send the vehicle information to the server, send the connection request including the first dynamic password to the vehicle electronic device when receiving the first dynamic password sent by the server, and to send information to the vehicle device when the connection is successful.

At least one embodiment of the present disclosure also provides a server communicated with the electronic device. The server comprises a third processing component and a third storage component connected with the third processing component. The third storage component is configured to store first password corresponding information; and the third processing component is configured to generate the first dynamic password through a preset rule according to the vehicle information, the second time for receiving the vehicle information, and the first password corresponding information stored in the third storage component when receiving the vehicle information sent by the electronic device, and to send the first dynamic password to the electronic device.

At least one embodiment of the present disclosure also provides a communication system, comprising a vehicle electronic device, an electronic device and a server. The electronic device is configured to send vehicle information of a vehicle to the server, send a connection request including a first dynamic password to the vehicle electronic device when receiving a first dynamic password sent by the server, and send information to the vehicle electronic device when it is successfully connected with the vehicle electronic device; the server is configured to generate the first dynamic password through a preset rule according to the vehicle information, a second time for receiving the vehicle information, and stored first password corresponding information when receiving the vehicle information, and to send the first dynamic password to the electronic device: and the vehicle electronic device is configured to generate a second dynamic password through the preset rule according to the first time for receiving the connection request and stored first password information and vehicle information when receiving the connection request including the first dynamic password sent by the electronic device, and to receive information sent by the electronic device when determining that the second dynamic password is matched with the first dynamic password, in which a difference between the first time and the second time is less than or equal to a preset duration.

At least one embodiment of the present disclosure also provides an information receiving method of a vehicle electronic device, comprising: generating a second dynamic password according to a first time for receiving a connection request and stored first password information and vehicle information when receiving a connection request including a first dynamic password sent by an external electronic device; and receiving information sent by the external electronic device when determining that the second dynamic password is matched with the first dynamic password. The first dynamic password is a dynamic password generated by a server through a preset rule, according to vehicle information of a vehicle sent by the electronic device, a second time for receiving the vehicle information, and first password corresponding information stored in the server, and sent to the electronic device; the first password corresponding information is matched with the first password information; and a difference between the first time and the second time is less than or equal to a preset duration.

At least one embodiment of the present disclosure also provides an information sending method of an electronic device, comprising: sending vehicle information to a server; and sending a connection request including a first dynamic password to a vehicle electronic device when receiving the first dynamic password sent by the server, and sending information to the vehicle device when the connection is successful.

BRIEF DESCRIPTION OF THE DRAWINGS

Embodiments of the present disclosure will be described in more detail below with reference to drawings to enable one of ordinary skill in the art understand embodiments of the present disclosure more clearly, in which.

DETAILED DESCRIPTION

Technical solutions of the embodiments will be described in a clearly and fully understandable way in connection with the drawings related to the embodiments of the disclosure. It is apparent that the described embodiments are a part hut not all of the embodiments of the disclosure. Based on the described embodiments herein, one of ordinary skill in the art can obtain other embodiment(s), without any creative work, which shall be within the scope of the disclosure. It is to be noted that the same or similar numerals represent the same or similar elements or elements with same or similar functions herein. Embodiments described below with reference to the drawings are exemplarily for explaining the disclosure instead of limiting it.

Figure 1:
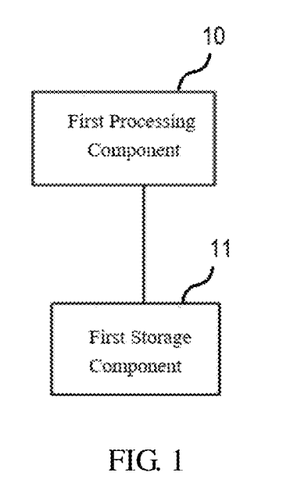
FIG. 1 is a schematically structural view of a vehicle electronic device provided by an embodiment of the present disclosure.

As shown in FIG. 1, the vehicle electronic device provided by an embodiment of the present disclosure comprises: a first processing component 10 and a first storage component 11 connected with the first processing component 10. First password information and vehicle information of a vehicle are stored in the first storage component 11. The first processing component 10 is configured to generate a second dynamic password through a preset rule according to the first time for receiving a connection request and first password information and vehicle information stored in the storage component 11 when receiving the connection request including a first dynamic password sent by an external electronic device, and receive information sent by the external electronic device when determining that the second dynamic password is matched with the first dynamic password. The first dynamic password is a dynamic password generated by a server through a preset rule according to the vehicle information sent by the external electronic device, the second time for receiving the vehicle information, and first password corresponding information stored in the server, and sent to the electronic device. The first password corresponding information is matched with the first password information. The difference between the first time and the second time is less than or equal to a preset duration. For instance, the vehicle information may be a license plate number of the vehicle, and the vehicle electronic device may be an electronic tag, but the embodiment of the present disclosure is not limited thereto.

It is to be noted that the first time and the second time are the time at which different devices receive corresponding information and have small probability of being completely the same, so, for example, dynamic passwords generated by the first processing component and the server within basically the same time period can be matched with each other. That is to say, because the difference between the first time and the second time is less than or equal to a preset duration and the first processing component and the server generate the dynamic passwords through the same preset rule, when the vehicle electronic device is communicated with the external electronic device, different dynamic passwords can be generated in the case of large time span, so as to improve the safety of the communication between the vehicle electronic device and the external electronic device, and meanwhile, avoid the problem of unmatched dynamic passwords as different electronic devices have different time in receiving different information. The first processing component may generate a second dynamic password according to the preset time period provided for the time for receiving the connection request, the first password information and the vehicle information. Similarly, the server may generate the first dynamic password according to the preset time period provided for the time for receiving the vehicle information, the vehicle information and the first password corresponding information. For instance, the time of a day can be divided into 24 time periods by the hour; the time for receiving the connection request of the first processing component is 8.30 a.m. on Mar. 14, 2018, the time for receiving the vehicle information of the server is 8:10 a.m. on Mar. 14, 2018, in the process of generating corresponding dynamic password, the hour unit may be selected, that is, the first processing component may generate the second dynamic password according to the time point of 8 a.m. on Mar. 14, 2018, and the server may also generate the first dynamic password according to the time point of 8 am. on Mar. 14, 2018. In this way, the matching of the first dynamic password and the second dynamic password can be guaranteed. The time period may not use hour as unit but use minute as unit, but the embodiment of the present disclosure is not limited thereto. In addition, for instance, the first processing component may generate a string of pseudo-random numbers according to the first time, the first password information and the vehicle information at first, then extract random numbers with preset length, from preset positions of the pseudo-random numbers, as the second dynamic password. Likewise, the server may also adopt the same way to generate the first dynamic password. The algorithm adopted by the server is the same as the algorithm adopted by the vehicle electronic device. The first password information may include a first random number seed and a first static password. The first password corresponding information may include a first corresponding random number seed and a first corresponding static password.

For instance, the first processing component is also configured to send information to an electronic device carried by a vehicle owner when receiving the connection request sent by the electronic device carried by the vehicle owner.

For instance, the external electronic device may be a mobile electronic device carried by a traffic police, for example, may be a mobile phone carried by the traffic police, and the information sent to the vehicle electronic device may be traffic ticket information. The external electronic device may also be a computer of a vehicle management administration, and the information sent to the vehicle electronic device may be at least one of annual check and insurance information. The external electronic device may also be a computer at a car park, and the information sent to the vehicle electronic device may correspondingly be parking fee payment information Detailed description will be given below through examples.

For instance, the external electronic device is a mobile phone carried by a traffic police. It is to be understood that the mobile phone carried by the traffic police is also provided with corresponding second processing component, and the second processing component may be configured to send vehicle information of an offending vehicle to the server, may send a connection request including a first dynamic password to the vehicle electronic device when receiving the first dynamic password sent by the server, and may send traffic ticket information to the vehicle electronic device when the second processing component is successfully connected with the vehicle electronic device. For instance, the mobile phone carried by the traffic police also sends a fine payment website to the first processing component of the vehicle device when sending the traffic ticket information; and the first processing component is also configured to send the traffic ticket information and the fine payment website to an electronic device terminal carried by the vehicle owner when receiving the connection request of the electronic device terminal carried by the vehicle owner, so that the electronic device terminal carried by the vehicle owner can pay the fine according to the traffic ticket information and the foe payment website. In the embodiment of the present disclosure, the mobile phone of the traffic police also sends the fine payment website to the first processing component when sending the traffic ticket information to the vehicle, and then may send the traffic ticket information and the fine payment website to the vehicle owner when the vehicle electronic device is connected with the electronic device carried by the vehicle owner, so that the vehicle owner can pay the fine through the electronic device terminal carried by the vehicle owner, and then payment can be conveniently made in the case of vehicle violation, which can permit the normal driving of the vehicle.

Moreover, for instance, the external electronic device may be a computer of a vehicle management administration. The computer of the vehicle management administration may also include corresponding second processing component, and the second processing component may be configured to send vehicle information of a vehicle to the server, and send a connection request including a first dynamic password to the vehicle electronic device when receiving the first dynamic password fed back by the server, and send at least one of annual check and insurance information to the vehicle electronic device after the second processing component is successfully connected with the vehicle electronic device. In view of storage safety, the annual check and/or insurance information may be stored in the server and may be called by the computer of the vehicle management administration and subsequently sent to the vehicle electronic device, or the computer of the vehicle management administration sends call information of annual check and/or insurance information at the same time when sending the vehicle information to the server terminal, and sends the annual check and/or insurance information to the vehicle electronic device after the computer of the vehicle management administration is successfully connected with the vehicle electronic device through dynamic password matching.

Moreover, for instance, the external electronic device may be a computer at a car park. The computer at the car park may also be provided with a monitoring component and corresponding second processing component connected with the monitoring component. The monitoring component may be configured to acquire vehicle information of a vehicle entering the car park, the initial time of the vehicle entering the car park, and the end time of the vehicle leaving the car park. The second processing component may generate parking fee payment information of the vehicle and a parking fee payment website according to the vehicle information, the initial time of the vehicle entering the car park, and the end time of the vehicle leaving the car park, acquired by the monitoring component, and send the parking fee payment information of the vehicle and the parking fee payment website to the vehicle electronic device.

Figure 2:
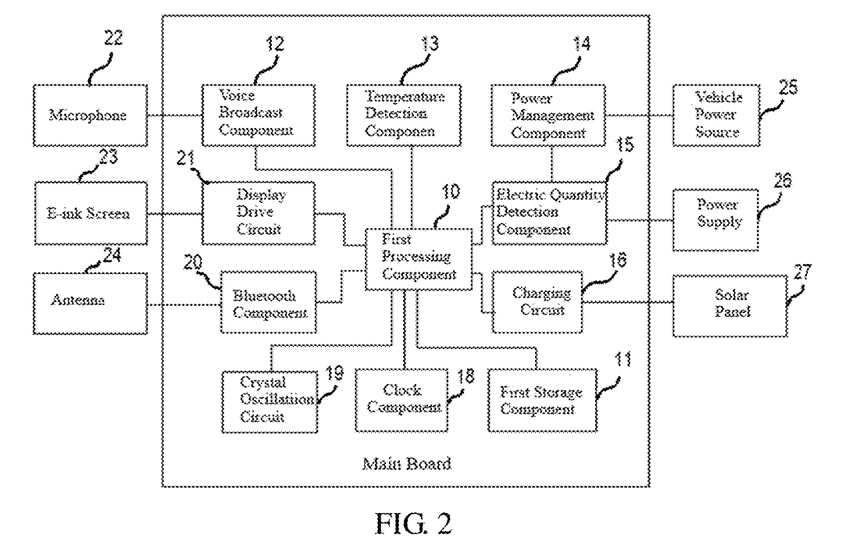
FIG. 2 is a schematically structural view of a vehicle electronic device provided by an embodiment of the present disclosure.

As shown in FIG. 2, for instance, the vehicle electronic device may consist of a motherboard and motherboard peripheral units. The first processing component 10 and the first storage component 11 are arranged on the motherboard. The motherboard may also be provided with a display drive circuit 21, a Bluetooth component 20, a voice, broadcast component 12, a temperature detection component 13, an electric quantity detection component 15, a charging circuit 16, a clock component 18, and a crystal oscillation circuit 19, which are connected with the first processing component 10, and also includes a power management component 14 connected with the electric quantity detection component 15. The vehicle electronic device further comprises a display screen which is connected with the display drive circuit 21 and may be an E-ink screen 23, a microphone 22 connected with the voice broadcast component 12, an antenna 24 connected with the Bluetooth component 20, a vehicle power source 25 connected with the power management component 14, a power supply 26 connected with the electric quantity detection component 15, and a solar panel 27 connected with the charging circuit 16. The first processing component 10 may be a microprogrammed control unit (MCI) having low power consumption and sleep function, may select stm32 series MCU, but the embodiment of the present disclosure is not limited thereto. The first storage component 11 may be a flash memory and is configured to store first password information, second password information, third password information, vehicle information of the current vehicle, an annual check logo picture, an insurance logo picture, etc., but the embodiment of the present disclosure is not limited thereto. The E-ink screen 23 is configured to display information, such as annual check and/or insurance information, of the current vehicle. The Bluetooth component 20 is configured to be communicated with an external device, for example, communicated with the external electronic device. The first processing component 10 is communicated with the external electronic device through the Bluetooth component 20. The clock component 18 is configured to provide accurate time for the vehicle electronic device. The display drive circuit 21 is configured to drive the E-ink screen 23. The voice broadcast component 12 is configured to prompt traffic ticket information, broadcast greeting, etc. For instance, after the vehicle is started, the vehicle electronic device is powered by an external power source, enters the normal working state from a low power consumption state, and simultaneously turns on the voice prompt function. The voice broadcast component 12 prompts the traffic ticket information when the traffic ticket information is sent to the vehicle, and sends greeting information when no traffic ticket information is sent to the vehicle. The temperature detection component 13 is configured to detect the temperature in the vehicle. For instance, the vehicle owner may examine the temperature in the vehicle before getting into the car. For instance, the vehicle electronic device may be mounted on one surface of a windshield of the vehicle facing the inside of the vehicle. The vehicle electronic device is equipped with the temperature detection component 13. After the vehicle stalls, the temperature in the vehicle is detected at a regular time period. When the temperature in the car is too high, the temperature in the car and high-temperature alarm information are displayed on the vehicle electronic device, and the vehicle owner can examine the temperature in the car through the vehicle electronic device before getting into the car. The power management component 14 is configured to switch between the vehicle power source 25 and the power supply 26 of the vehicle electronic device and charge the power supply 26. The charging circuit 16 is configured to adopt the electric energy provided by the solar panel to charge the power supply 26 of the vehicle electronic device. For instance, when the vehicle is parked and the light intensity is sufficient, the solar charging function is turned on, and the solar panel 27 is adopted to charge the power supply 26 of the vehicle electronic device. The vehicle electronic device in the embodiment of the present disclosure may be an electronic tag.

Based on the same invention concept, an embodiment of the present disclosure also provides an electronic device, which is configured to be communicated with the vehicle electronic device provided by the embodiment of the present disclosure. The electronic device comprises: a second processing component configured to send vehicle information to a server, send a connection request including a first dynamic password to the vehicle electronic device when receiving the first dynamic password sent by the server, and send information to the vehicle electronic device when the connection is successful. The electronic device may be a mobile phone carried by a traffic police, a computer of a vehicle management administration, or a computer at a car park.

Based on the same invention concept, an embodiment of the present disclosure also provides a server, which is configured to be communicated with the electronic device provided by the embodiment of the present disclosure. The server comprises: a third processing component and a third storage component connected with the third processing component. The third storage component is configured to store first password corresponding information. The third processing component is configured to generate a first dynamic password through the preset rule according to vehicle information, the second time for receiving the vehicle information, and first password corresponding information stored in the third storage component when receiving the vehicle information sent by the electronic device, and send the first dynamic password to the electronic device.

Based on the same invention concept, an embodiment of the present disclosure also provides a communication system, which comprises a vehicle electronic device, an electronic device, and a server.

The electronic device is configured to send vehicle information of a vehicle to the server, send a connection request including a first dynamic password to the vehicle electronic device when receiving the first dynamic password sent by the server, and send information to the vehicle electronic device when it is successfully connected with the vehicle electronic device.

The server is configured to generate the first dynamic password through the preset rule according to the vehicle information, the second time for receiving the vehicle information, and stored first password corresponding information when receiving the vehicle information, and send the first dynamic password to the electronic device.

The vehicle electronic device is configured to generate a second dynamic password through the preset rule according to the first time for receiving the connection request, stored first password information and vehicle information when receiving the connection request including the first dynamic password sent by the external electronic device, and receive information sent by the electronic device when determining that the second dynamic password is matched with the first dynamic password.

Figure 3:
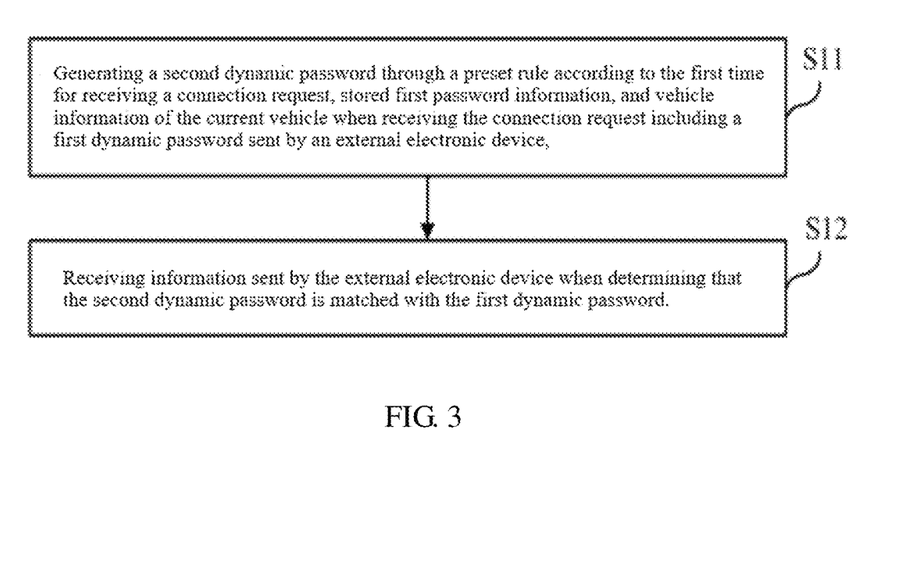
FIG. 3 is a flowchart illustrating information receiving of the vehicle electronic device provided by an embodiment of the present disclosure.

Based on the same concept, an embodiment of the present disclosure also provides an information receiving method of a vehicle electronic device, which, as shown in FIG. 3, comprises following operations.

S11: generating a second dynamic password through a preset rule according to the first time for receiving a connection request, stored first password information, and vehicle information of the current vehicle when receiving the connection request including a first dynamic password sent by an external electronic device.

S12: receiving information sent by the external electronic device when determining that the second dynamic password is matched with the first dynamic password. The first dynamic password is a dynamic password generated by a server through the preset rule according to the vehicle information sent by the electronic device, the second time for receiving the vehicle information, and first password corresponding information stored in the server. The first password corresponding information is matched with the first password information. The difference between the first time and the second time is less than or equal to a preset duration.

Figure 4:
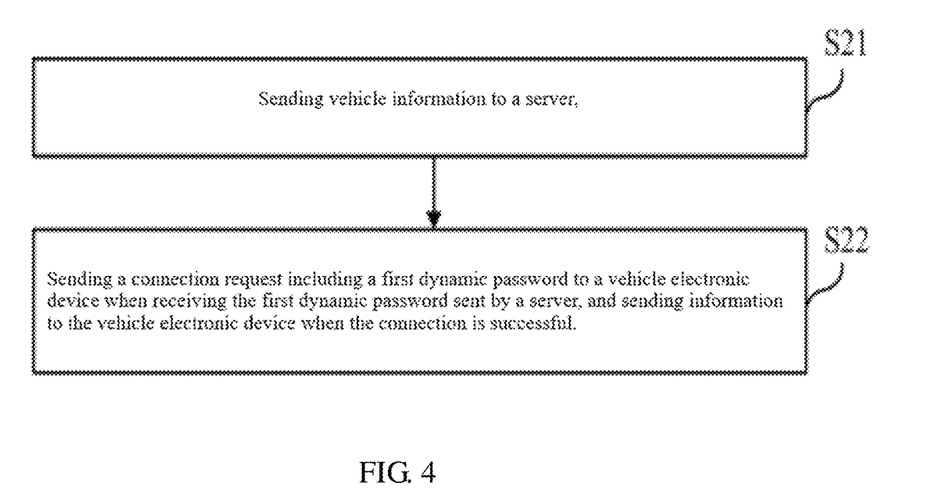
FIG. 4 is a flowchart illustrating information receiving of the vehicle electronic device provided by an embodiment of the present disclosure.

Based on the same concept, an embodiment of the present disclosure also provides an information sending method of an electronic device, which, as shown in FIG. 4, comprises following operations.

S21: sending vehicle information to a server.

S22: sending a connection request including a first dynamic password to a vehicle electronic device when receiving the first dynamic password sent by a server, and sending information to the vehicle electronic device when the connection is successful.

In order to more clearly understand the working principles of the vehicle electronic device provided by the embodiments of the present disclosure, detailed exemplary description will be given below to the vehicle electronic device provided by the embodiments of the present disclosure with reference to FIGS. 5-7.

Figure 5:
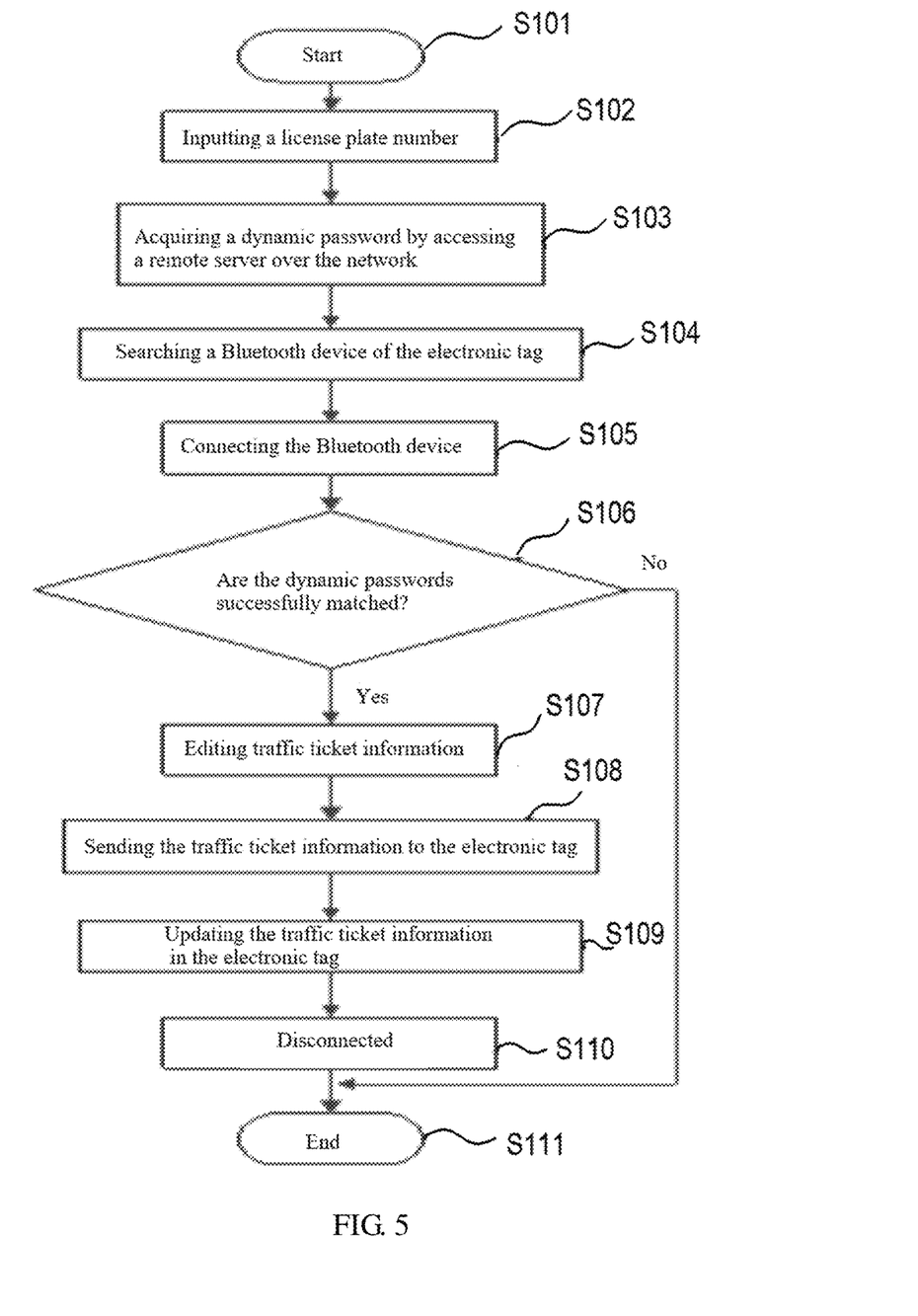
FIG. 5 is a flowchart illustrating the process when the vehicle electronic device provided by an embodiment of the present disclosure receives an electronic traffic ticket.

For instance, as shown in FIG. 5 which is a flowchart illustrating the process when a mobile phone terminal of a traffic police sends traffic ticket information to a vehicle electronic tag, the process comprises following operations.

S101: start.

S102: allowing the traffic police to input a license plate number of the current offending vehicle into a corresponding application of the mobile phone terminal.

S103: allowing the mobile phone terminal of the traffic police to acquire a first dynamic password by accessing a remote server over the network.

S104: allowing the mobile phone terminal of the traffic police to search Bluetooth of the vehicle electronic tag via Bluetooth.

S105: allowing the mobile phone terminal of the traffic police to send a Bluetooth connection request including the first dynamic password to the vehicle electronic tag.

S106: allowing the vehicle electronic tag to generate a second dynamic password through the preset rule according to stored vehicle information, first password information and the first time for receiving the connection request, determining whether the first dynamic password sent by the mobile phone terminal of the traffic police is matched with the second dynamic password generated by the electronic tag, if so, executing S107, if not, executing S111.

S107: allowing the mobile phone terminal of the traffic police to edit traffic ticket information.

S108: allowing the mobile phone terminal of the traffic police to send the traffic ticket information to the vehicle electronic tag.

S109: allowing the vehicle electronic tag to update the traffic ticket information.

S110: allowing the vehicle electronic tag to be disconnected with the mobile phone terminal of the traffic police.

S111: end.

Figure 6:
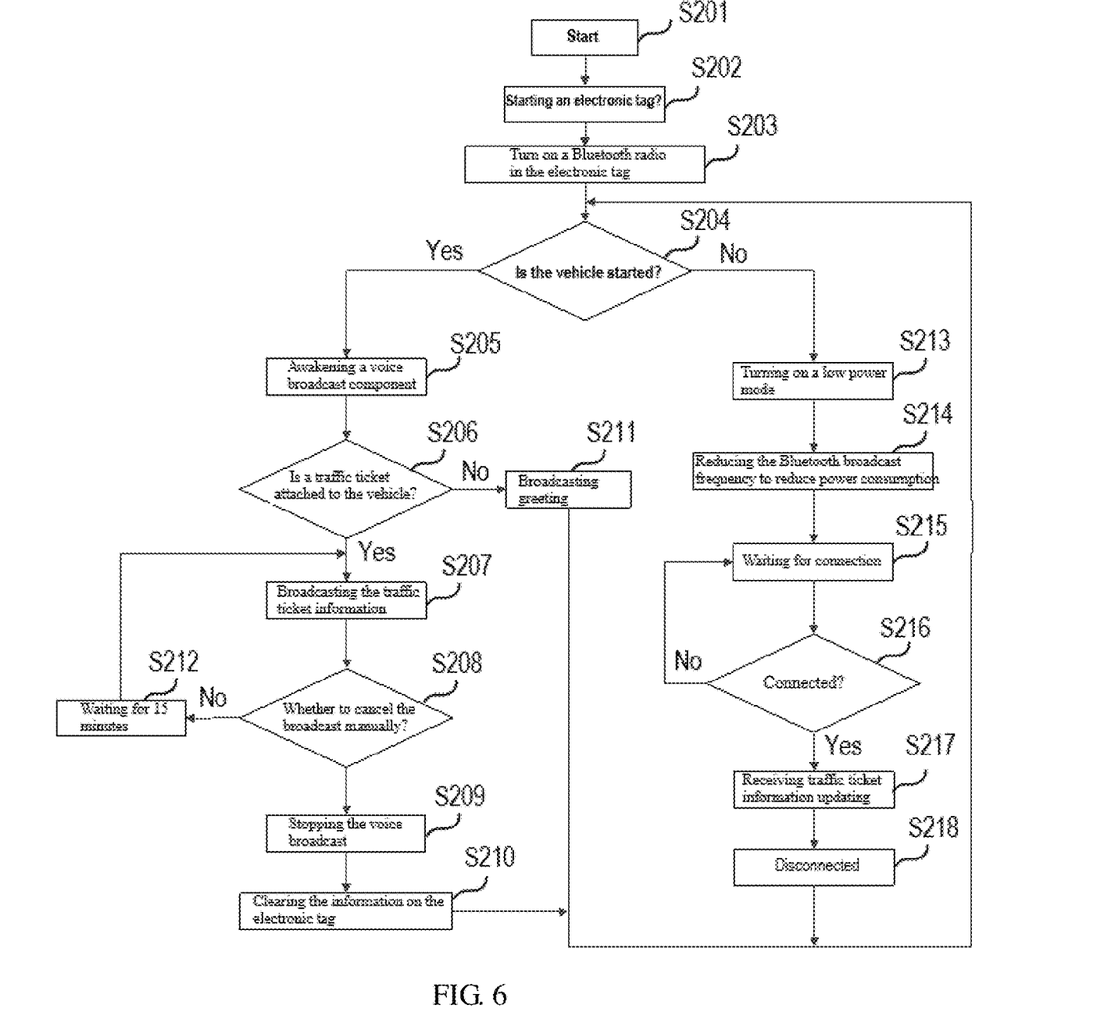
FIG. 6 is a flowchart illustrating a method that the vehicle electronic device provided by an embodiment of the present disclosure operates in different states of a vehicle.

For instance, as shown in FIG. 6 which is a flowchart illustrating the process when the vehicle electronic tag works in different states of a vehicle, the process comprises:

S201: start.

S202: starting the electronic tag.

S203: allowing the electronic tag to turn on a Bluetooth radio.

S204: determining whether the vehicle is started, if so, executing S205, if not, executing S213.

S205: awakening a voice broadcast component.

S206: determining whether a traffic ticket is attached to the current vehicle, that is, whether electronic traffic ticket information is sent, if so, executing S207, if not, executing S211.

S207: broadcasting the traffic ticket information.

S208: determining whether to cancel the broadcasting, if so, executing S209, if not, executing S212.

S209: stopping the voice broadcasting.

S210: clearing information of the electronic tag.

S211: broadcasting greeting.

S212: waiting for the first preset duration, e.g., the first preset duration may be 15 minutes.

S213: turning on a low power mode.

S214: decreasing the Bluetooth broadcast frequency to reduce power consumption.

S215: waiting for connection.

S216: determining whether the electronic tag is connected, is so, executing S217, if not, executing S215.

S717: receiving traffic ticket information update.

S218: disconnected.

Figure 7:
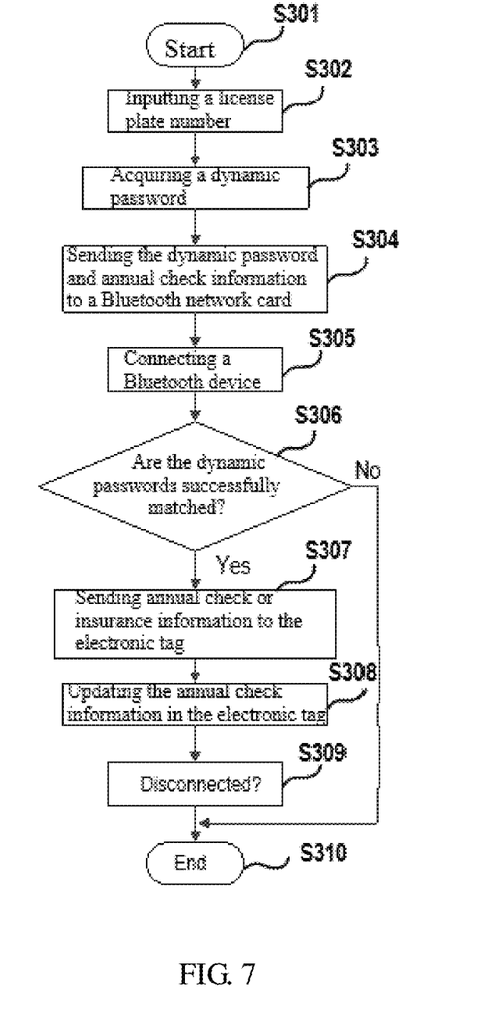
FIG. 7 is a flowchart illustrating the process when the vehicle electronic device provided by an embodiment of the present disclosure receives annual check information.

For instance, as shown in FIG. 7 which is a flowchart illustrating the process when a computer of a vehicle management administration sends annual check information to a vehicle electronic tag, the process comprises following operations.

S301: start.

S302: inputting a license plate number of the current vehicle into a corresponding application of the computer of the vehicle management administration.

S303: allowing the computer of the vehicle management administration to acquire a first dynamic password by accessing a remote server via the network, and simultaneously sending a request for acquiring the annual check information.

S304: allowing the computer of the vehicle management administration to search Bluetooth of the vehicle electronic tag through a Bluetooth network card.

S305: allowing the computer of the vehicle management administration to be in Bluetooth communication with the vehicle electronic tag.

S306: allowing the vehicle electronic tag to determine whether the first dynamic password sent by the computer of the vehicle management administration is matched with a second dynamic password generated by the electronic tag, if so, executing S307, if not, executing S370.

S307: allowing the computer of the vehicle management administration to send annual check or insurance information to the vehicle electronic tag.

S308: allowing the vehicle electronic tag to update the annual check or insurance information.

S309: allowing the computer of the vehicle management administration to be disconnected with the vehicle electronic tag.

S310: end.

Description will be given below to the interactive process of the electronic tag provided by the embodiments of the present disclosure and external components when receiving traffic ticket information and updating annual check information with reference to FIG. 8. For a first scene in which a traffic police sends traffic ticket information, referring to the left view of FIG. 8, when a vehicle is parked at an unreasonable parking position and discovered by a traffic police, the traffic police inputs the license plate number of the current vehicle into a corresponding application of a mobile phone terminal at first; the mobile phone terminal may send the license plate number of the current vehicle to a server via the network; the server may generate a string of pseudo-random numbers by a corresponding algorithm according to the time for receiving the license plate number and a prestored first corresponding random number seed and a first corresponding static password, extract random numbers with a preset length at a preset position, from the pseudo-random numbers, as a first dynamic password, and send the first dynamic password to the mobile phone terminal of the traffic police; the traffic police sends a Bluetooth connection request including the first dynamic password to an electronic tag of the vehicle when receiving the first dynamic password; the electronic tag of the vehicle generates a string of pseudo-random numbers by the same algorithm as the server terminal according to the time for receiving the connection request and the prestored first random number seed and the first static password when receiving the connection request, extracts random numbers with the preset length at the preset position, from the pseudo-random numbers, as a second dynamic password (it is to be understood that the preset position and the preset length when the electronic tag extracts the random numbers from the pseudo-random numbers as the second dynamic password are the same as the preset position and the preset length when the server terminal extracts the random numbers from the pseudo-random numbers as the first dynamic password), and, when determining that the second dynamic password is the same as the sent first dynamic password, the electronic tag of the vehicle communicates with the mobile phone terminal of the traffic police in Bluetooth connection mode; and the mobile phone terminal of the traffic police may send the traffic ticket information and a fine payment website to the electronic tag of the vehicle. It is to be noted that the processes of generating the dynamic passwords of the server terminal and the vehicle electronic device are shown in one process for convenience of illustration in FIG. 8, and the first corresponding random number seed, the first random number seed, etc. are not distinguished.

Figure 8:
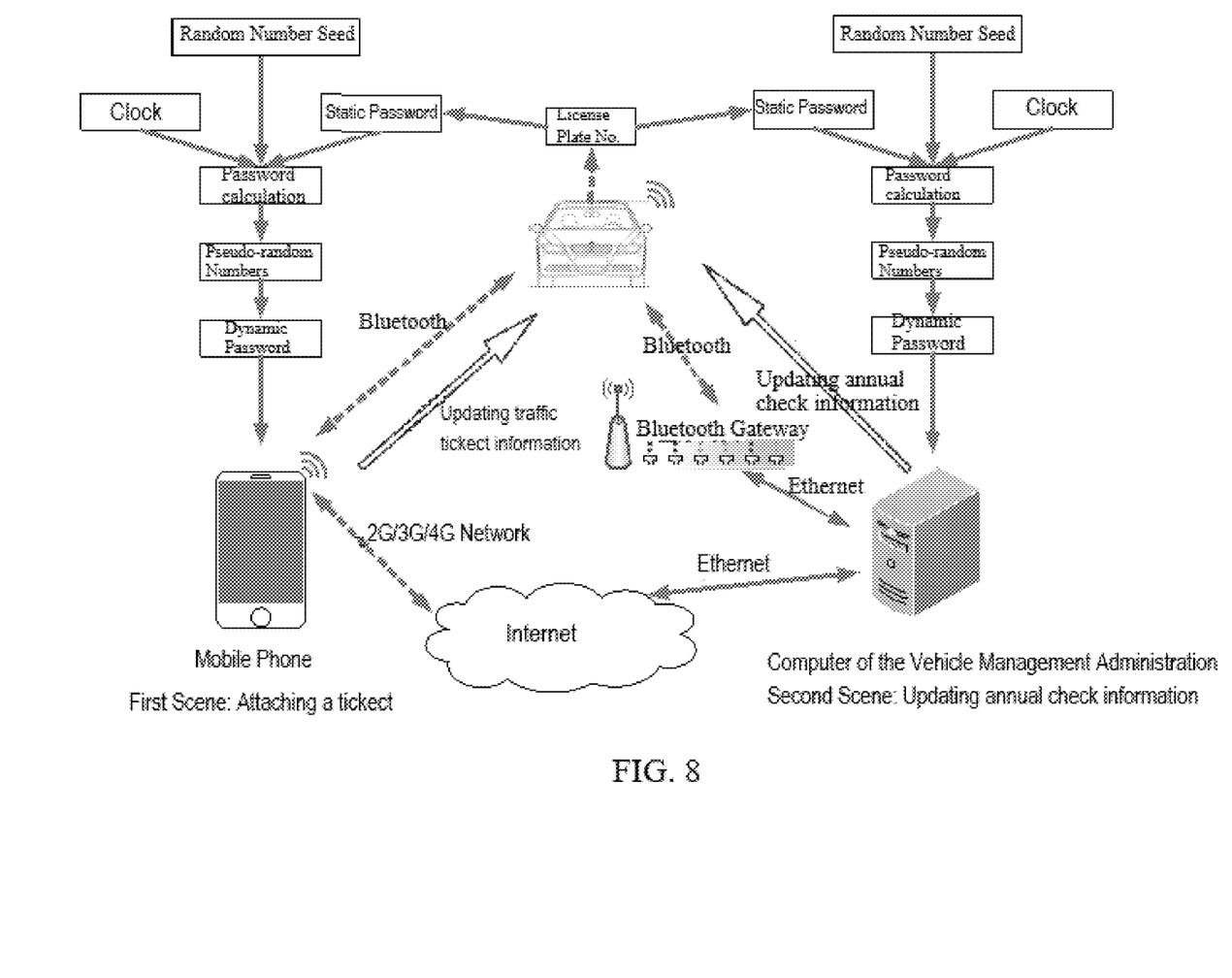
FIG. 8 is a schematic diagram illustrating the interactive process when the vehicle electronic device provided by an embodiment of the present disclosure receives an electronic traffic ticket and updates an annual check.

As shown in the right view of FIG. 8, when a vehicle requires annual check, the vehicle is driven to a vehicle management update location with Bluetooth gateway coverage; a license plate number of the vehicle is input into a computer of a vehicle management administration, the license plate number is sent to a server terminal, and meanwhile, a request for acquiring annual check information is sent to the server terminal of the internet; the server terminal may generate a string of pseudo-random numbers by an algorithm according to the time for receiving the license plate number and a prestored first corresponding random number seed and a first corresponding static password, extract random numbers with a preset length at a preset position, from the pseudo-random numbers, as a first dynamic password, and send the first dynamic password and the annual check information of the vehicle to the computer terminal of the vehicle management administration; the computer terminal of the vehicle management administration is communicated with an electronic tag through a Bluetooth network card when receiving the first dynamic password, and sends a connection request including the first dynamic password to the electronic tag; the electronic tag generates a string of pseudo-random numbers by a corresponding algorithm according to the stored license plate number, a first random number seed, a first static password, and the time for receiving the connection request when receiving the connection request, and extracts random numbers with a preset length at a preset position, from the pseudo-random numbers, as a second dynamic password, and feeds back information of successful connection to the computer terminal of the vehicle management administration when determining that the first dynamic password is matched with the second dynamic password; the computer terminal of the vehicle management administration sends the annual check information to the electronic tag of the vehicle after receiving the information of successful connection; and the electronic tag updates display information after receiving the annual check information.

Figure 9:
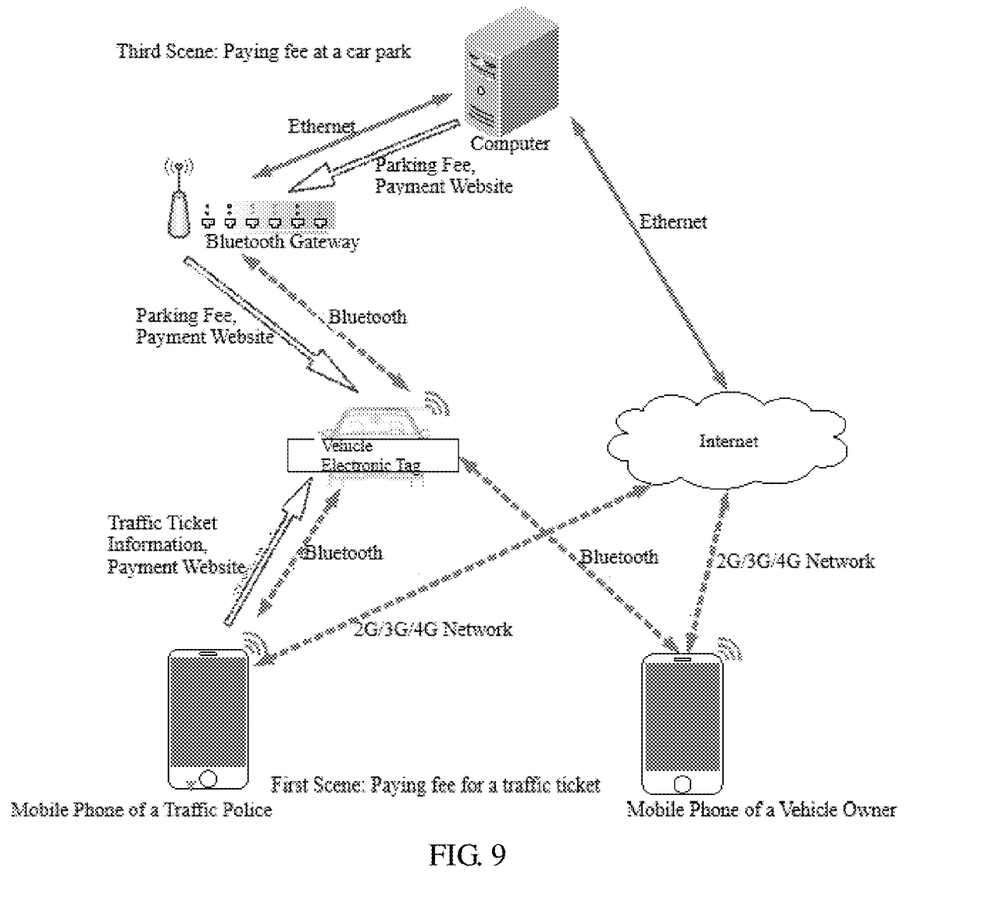
FIG. 9 is a schematic diagram illustrating the interactive process when the vehicle electronic device provided by an embodiment of the present disclosure receives an electronic traffic ticket and pays parking fees.

Description will be given below to the interactive process when the electronic tag provided by the embodiments of the present disclosure sends electronic traffic ticket information and parking fee information to a vehicle owner with reference to FIG. 9. The process in which a mobile phone terminal of a traffic police sends the traffic ticket information to a vehicle electronic device is the same as the description of corresponding contents and will not be repeated here. After the vehicle owner gets into the car, a voice broadcast component prompts that there is traffic ticket information; a mobile phone terminal carried by the vehicle owner is in Bluetooth communication with the electronic tag; after communication is successful, the mobile phone of the vehicle owner receives traffic ticket information and a fine payment website of the electronic tag; and then the vehicle owner can pay the fine correspondingly through the carried mobile phone terminal.

For a third scene for paying parking fee, after a vehicle enters a car park, a monitoring computer of the car park records a license plate number of the vehicle and the initial time entering the car park, records the end time of the vehicle leaving the car park when the vehicle leaves the car park, calculates the parking fee, and sends the license plate number to a server over the internet by inputting the license plate number of the current vehicle; subsequently, the server terminal of the internet sends a first dynamic password to a monitor, e.g., a computer, of the car park; the monitoring computer of the car park sends a connection request including the first dynamic password to a vehicle electronic tag through a Bluetooth network card; the vehicle electronic tag generates a second dynamic password when receiving the connection request including the first dynamic password; when determining that the second dynamic password is matched with the first dynamic password, the vehicle electronic tag is communicated with the monitoring computer of the car park, and then sends parking fee payment information and a parking fee payment website to the vehicle electronic tag; and a vehicle owner may acquire the parking fee payment information and the parking fee payment website after the mobile phone is communicated with the vehicle electronic tag through Bluetooth of the mobile phone, and then online payment is finished. The vehicle owner may also adopt the binding of a fee payment application of the mobile phone terminal and a payment system of the car park to realize the automatic payment.

It is to be noted that the server for sending the traffic ticket information, the server for sending the annual check and/or insurance information, and the server for sending the parking fee payment information may be the same server, and the server may grant different access rights to the computer or the mobile phone in different scenes.

In the embodiment of the present disclosure, the vehicle electronic device comprises a first processing component and a first storage component connected with the first processing component. First password information and vehicle information of a vehicle are stored in the first storage component. The first processing component of the vehicle electronic device may generate a second dynamic password, and may receive information sent by an external electronic device when the second dynamic password is successfully matched with the first dynamic password sent by the external electronic device, so as to avoid the problems of low interaction efficiency and complex and time-consuming interactive processes of the vehicle and the external device when the vehicle is interactive with the external electronic device. Moreover, the safety of information transmission can be guaranteed by generating the dynamic passwords and sending the information when the two dynamic passwords are successfully matched.

The description above is only exemplary embodiments of the present disclosure, and the scope of the present disclosure is not limited thereto. Any changes or substitutions readily conceived by one of ordinary skill in the art without departing the technical scope of the present embodiments, shall fall within the scope of the present disclosure.

What is claimed is:

1. A vehicle electronic device, comprising, a first processing component and a first storage component connected with the first processing component, wherein first password information and vehicle information are stored in the first storage component;
    the first processing component is configured to generate a second dynamic password through a preset rule according to a first time for receiving a connection request, and the first password information and the vehicle information stored in the first storage component, when receiving the connection request including a first dynamic password sent by an external electronic device, and to receive information sent by the external electronic device when determining that the second dynamic password is matched with the first dynamic password;
    wherein the first dynamic password is a dynamic password generated by a server through the preset rule, according to the vehicle information sent by the electronic device, a second time for receiving the vehicle information, and first password corresponding information stored in the server, and sent to the electronic device; the first password corresponding information is matched with the first password information; and a difference between the first time and the second time is less than or equal to a preset duration; and
    wherein the vehicle electronic device is an electronic tag.

2. The vehicle electronic device according to claim 1, wherein the first processing component is also configured to send the information to the electronic device carried by a vehicle owner when receiving the connection request sent by the electronic device carried by the vehicle owner.

3. The vehicle electronic device according to claim 1, wherein the first password information includes a first random number seed and a first static password; and the first password corresponding information includes a first corresponding random number seed and a first corresponding static password.

4. The vehicle electronic device according to claim 1, further comprising a display screen and a Bluetooth component connected with the first processing component, wherein
    the display screen is configured to display at least one of annual check and insurance information of a vehicle; and
    the first processing component is communicated with the external electronic device through the Bluetooth component.

5. The vehicle electronic device according to claim 4, wherein the display screen is an electronic ink display screen.

6. An electronic device communicated with the vehicle electronic device according to claim 1, comprising:
    a second processing component configured to send the vehicle information to the server, send the connection request including the first dynamic password to the vehicle electronic device when receiving the first dynamic password sent by the server, and to send information to the vehicle device when the connection is successful.

7. A server communicated with the electronic device according to claim 6, comprising,
    a third processing component and a third storage component connected with the third processing component, wherein
    the third storage component is configured to store first password corresponding information; and
    the third processing component is configured to generate the first dynamic password through a preset rule according to the vehicle information, the second time for receiving the vehicle information, and the first password corresponding information stored in the third storage component when receiving the vehicle information sent by the electronic device, and to send the first dynamic password to the electronic device.

8. A communication system, comprising a vehicle electronic device, an electronic device and a server, wherein
    the electronic device is configured to send vehicle information of a vehicle to the server, send a connection request including a first dynamic password to the vehicle electronic device when receiving a first dynamic password sent by the server, and send information to the vehicle electronic device when successfully connected with the vehicle electronic device;
    the server is configured to generate the first dynamic password through a preset rule according to the vehicle information, a second time for receiving the vehicle information, and stored first password corresponding information when receiving the vehicle information, and to send the first dynamic password to the electronic device; and
    the vehicle electronic device is configured to generate a second dynamic password through the preset rule according to the first time for receiving the connection request and stored first password information and vehicle information when receiving the connection request including the first dynamic password sent by the electronic device, and to receive information sent by the electronic device when determining that the second dynamic password is matched with the first dynamic password, in which a difference between the first time and the second time is less than or equal to a preset duration; and
    wherein the vehicle electronic device is an electronic tag.

9. An information receiving method of a vehicle electronic device, comprising:
    generating a second dynamic password according to a first time for receiving a connection request and stored first password information and vehicle information when receiving a connection request including a first dynamic password sent by an external electronic device; and receiving information sent by the external electronic device when determining that the second dynamic password is matched with the first dynamic password, in which the first dynamic password is a dynamic password generated by a server through a preset rule, according to vehicle information of a vehicle sent by the electronic device, a second time for receiving the vehicle information, and first password corresponding information stored in the server, and sent to the electronic device; the first password corresponding information is matched with the first password information; and a difference between the first time and the second time is less than or equal to a preset duration; and wherein the vehicle electronic device is an electronic tag.

10. An information sending method of the electronic device according to claim 6, comprising:
sending vehicle information to the server; and
sending the connection request including the first dynamic password to the vehicle electronic device when receiving the first dynamic password sent by the server, and sending information to the vehicle device when the connection is successful.

11. The vehicle electronic device according to claim 2, wherein the first password information includes a first random number seed and a first static password; and the first password corresponding information includes a first corresponding random number seed and a first corresponding static password.

12. The vehicle electronic device according to claim 11, further comprising a display screen and a Bluetooth component connected with the first processing component, wherein
the display screen is configured to display at least one of annual check and insurance information of a vehicle; and
the first processing component is communicated with the external electronic device through the Bluetooth component.

13. The vehicle electronic device according to claim 12, wherein the display screen is an electronic ink display screen.

* * * * *